United States Patent Office 3,096,939
Patented July 9, 1963

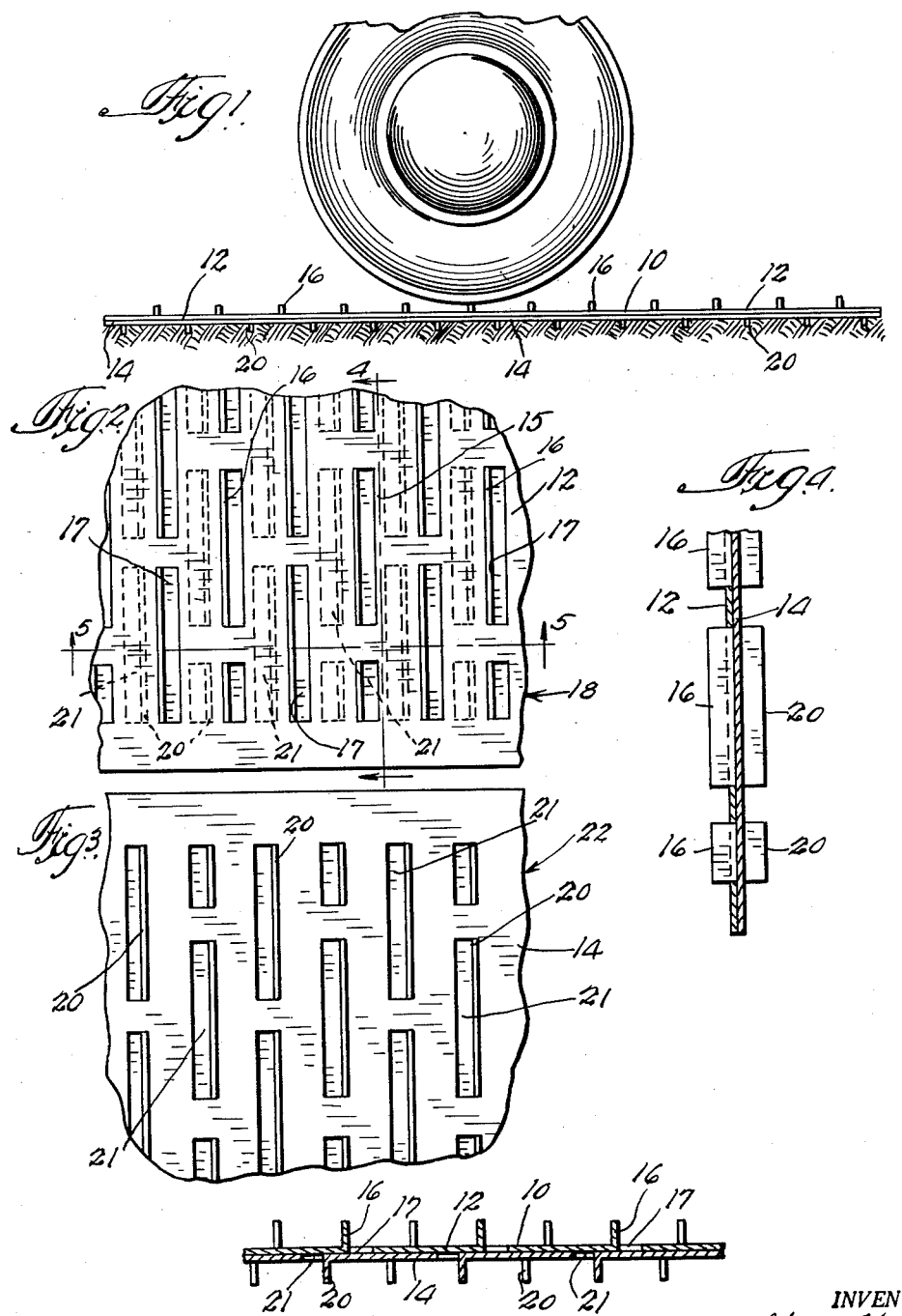

3,096,939
REVERSIBLE TRACTION DEVICE
Zoltan Kalfen, 2835 W. Jarlath, Chicago, Ill.
Filed Dec. 29, 1959, Ser. No. 862,625
2 Claims. (Cl. 238—14)

This invention relates to a traction device and more particularly to a reversible traction plate adapted to be used by motor vehicles in soft snow, mud, sand or where icy conditions do not offer sufficient traction to permit the driving wheels of the vehicle to grip the road.

It is well known that motor vehicles, particularly in winter time when road surfaces are covered with snow or ice, find it difficult to draw away from the curb and that ofttimes motor vehicles are stalled in muddy or sandy ground. The cause of the difficulty is lack of traction for the driving wheels.

Many attempts have been made to provide a device which would afford traction under these adverse circumstances but without any known satisfactory results. Typical of the prior art devices is that shown, for example, in the patent to Becker, No. 2,486,911. The patentee discloses a piece of sheet metal punched to provide protuberances on both sides; one side to engage the surface of the road and the other to provide a protective surface for the wheel. This device was unsatisfactory. It was dangerous to handle because of the jagged edges on the protuberances. Furthermore the soft snow or mud coming through the punched openings soon formed a packed, smooth surface on both sides of the device, covering the protuberances so that no traction was available either on the road side or the wheel side.

Ribbed devices such as those shown, for example, in the patent to Harding et al., No. 1,815,435, suffer from the same infirmity. The snow and the mud has a tendency to pack in hard between the ribs to create a smooth, glossy surface which affords no traction. Such snow and mud is not easily dislodged.

It is therefore an object of the present invention to provide a traction plate which can be used in soft snow or mud and on ice without endangering the fingers and hands of the user and which will not become coated to a smooth surface.

Another object of the invention is to provide a plate of durable material which can be used on any icy streets to provide starting traction from the curb or elsewhere for an automative vehicle.

A further object of the invention is to provide a simple traction plate which may be easily carried in the vehicle and which, by a simple placement in proximity to the wheel, provides sufficient temporary traction to overcome spin.

A still further object of the invention is to provide a simple, inexpensive device and one which will operate efficiently with a reasonable degree of certainty and which will not be dangerous to the hands.

The foregoing and other objects and advantages of the invention will become more apparent from a consideration of the following specifications and the accompanying drawings wherein:

FIGURE 1 is a cross-sectional view of the reversible traction plate shown in position under the wheel of an automobile;

FIGURE 2 is a fragmentary top-plan view of the upper plate and showing the lower plate in dotted lines;

FIGURE 3 is a fragmentary face view of the lower plate showing the staggered relation of the punch pattern;

FIGURE 4 is a sectional view taken on line 4—4 of FIG. 2; and

FIGURE 5 is a sectional view taken on line 5—5 of FIG. 2.

Describing the invention in detail and referring to the drawings, it will be seen that the novel reversible traction device comprises in general a rectangular plate 10 composed of two sheets, an upper sheet 12 and a lower sheet 14. The sheets 12 and 14 may be sheet steel, galvanized iron, sheet aluminum or other material, including a suitable plastic, and of any desired thickness and hardness. The upper sheet 12 is punched to provide a plurality of elongate, bladelike projections or tongues 16 and the corresponding elongate openings 17, the said projections and openings being of any desired shape and arranged in a predetermined pattern as shown at 18 (FIG. 2). The lower sheet 14 is similarly punched to provide a plurality of projections or tongues 20 and the corresponding openings 21, the said projections and openings on the lower sheet 14 being also formed in a definite pattern as shown at 22 in FIG. 3.

The shape of the projections or tongues 16 and 20, as shown in FIGS. 2 and 3, are rectangular and are formed with smooth edges by the stamping die to avoid the rough and ragged edges of the prior art devices which were dangerous to the hands and fingers when handled under adverse conditions. It is to be understood however that the tongues or projections 16 and 20 may be formed of any desired shape.

The punch pattern on both sheets may be identical or may differ from each other, it being preferred to have identical patterns, both for economy in manufacture and to create identical faces on both sides of the traction plate 10, thus making the plate reversible.

The sheets 12 and 14 are superimposed upon each other so that the projections 16 and 20 are turned outwardly as shown in FIG. 1 and the respective openings 17 and 21 are brought to bear at areas whereby the said openings are out of register with each other as shown in FIG. 2 and in cross-section in FIG. 5. The sheets 12 and 14 are then permanently secured together in such position by welding, riveting or any other satisfactory manner. When so secured, the upper and lower sheets form a single traction plate, the face pattern of each side of said plate 10 having protruding bladelike tongues to provide traction surface and either side being capable of use as the upper or lower surface.

The projections 16, shown on the upper plate 10 in FIGS. 1 and 5, afford traction for the wheel of the vehicle and the projections 20 of the lower plate are adapted to provide traction for the road surface. It will be noted (FIG. 2) that the pattern of the projections on each side of the plate is such that there is no area on the plate which does not carry sufficient projections to afford a good traction surface.

In manufacturing the novel traction device, either two sheets of material may be used, as shown in the preferred embodiment, or a single sheet of material may be punched on each side and bent on itself to provide upper and lower sheets as described. The device may be of any desired size or shape although it has been found that a rectangular plate measuring 24" in length and 9" in width gives very satisfactory results. The heights and angle of the projections 16 and 20 may be varied to provide for individual conditions. Under ordinary circumstances, it is preferred to keep the height of the tongues or projections within a range of 1/16" to 1/4". It is understood that the device may also be made by casting in a mold, in which event it would comprise a single plate of material having no openings therein and having tongues or projections extending from each face thereof.

When in use, the novel traction device is placed in front of and in immediate proximity to the wheel. It has been found that the rotation of the wheel itself will force the device under the tire to provide the necessary traction surface. It will be noted that the openings 17 and 21 being out of register, no snow, mud, or sand can permeate through the plate to impair the traction surface on the upper side and if snow or mud does accumulate against the tongues or projections 16 and 20, it is easily shaken off. It has been found that the device gives completely satisfactory results even under water.

Thus there is provided a traction device for vehicles which is safe to handle and reversible, which is simple and inexpensive to manufacture, which can be easily carried in the vehicle itself and which will give long and satisfactory service under any adverse conditions.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A reversible traction device for motor vehicles and the like, comprising, a pair of elongated sheets, each of said sheets being formed with a plurality of elongate openings and elongate projections integral with the sheet and upstanding therefrom along the long dimensions of said openings, said projections being bladelike, parallel to each other, perpendicular to the surface of the sheet, and normal to the long dimension of the sheet; said sheets being superimposed upon each other and permanently secured together with the projections facing outwardly and with the respective openings in each sheet out of register with each other to form a single imperforate plate having projections on each side thereof.

2. A reversible traction device for motor vehicles and the like, comprising, a pair of elongated sheets, each of said sheets being formed with a plurality of rectangular openings and rectangular projections integral with the sheet and upstanding therefrom along the long dimensions of said openings and of substantially the same size as that of the opening along which the respective projection upstands, said projections being bladelike, parallel to each other, perpendicular to the surface of the sheet, and normal to the long dimension of the sheet; said sheets being superimposed upon each other and permanently secured together with the projections facing outwardly and with the respective openings in each sheet out of register with each other to form a single imperforate plate having projections on each side thereof.

References Cited in the file of this patent

UNITED STATES PATENTS

| | | |
|---|---|---|
| 1,500,249 | McCracken et al. | Nov. 12, 1918 |
| 1,594,623 | Lundberg | Aug. 3, 1926 |
| 1,815,435 | Harding et al. | July 21, 1931 |
| 1,863,316 | Webster | June 14, 1932 |
| 2,190,195 | Schivinc | Feb. 13, 1940 |
| 2,428,680 | Piatak | Oct. 7, 1947 |
| 2,479,760 | Merrick | Aug. 23, 1949 |
| 2,486,911 | Becker | Nov. 1, 1949 |
| 2,553,216 | Simmons | May 15, 1951 |
| 2,975,977 | Chodacki et al. | Mar. 21, 1961 |